A. W. MONROE.
BUTTER-PACKAGE.

No. 183,588. Patented Oct. 24, 1876.

Witnesses
Elias C. Monroe
James B. Clement

Inventor
Ansil W. Monroe

UNITED STATES PATENT OFFICE.

ANSIL W. MONROE, OF PHILADELPHIA, PENNSYLVANIA.

IMPROVEMENT IN BUTTER-PACKAGES.

Specification forming part of Letters Patent No. 183,588, dated October 24, 1876; application filed September 18, 1876.

*To all whom it may concern:*

Be it known that I, ANSIL W. MONROE, of the city and county of Philadelphia, and State of Pennsylvania, have invented a new and Improved Vessel for Holding Acids and Oils; and I hereby declare that the following is a full, clear, and exact description thereof, reference being had to the accompanying drawings, making a part of this specification, and to the letters of reference marked thereon, in which the same letter represents the same thing in each figure.

Figure 1:
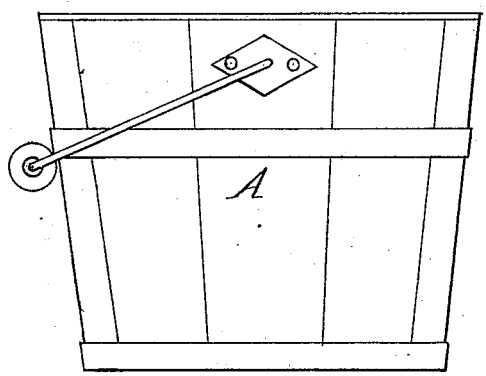
Figure 2:
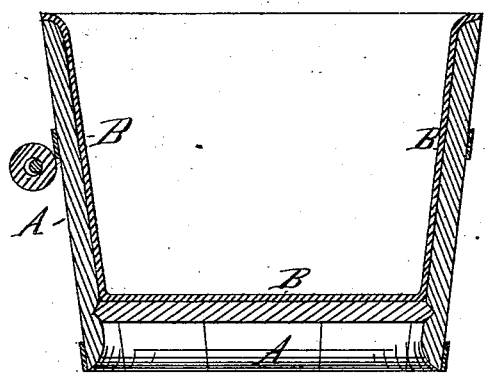
Figure 3:
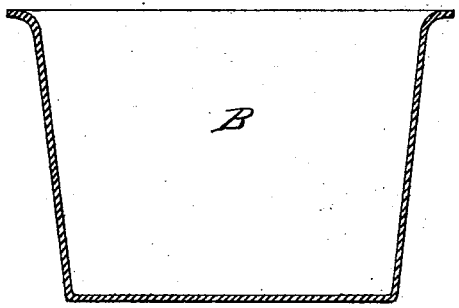
Figure 4:
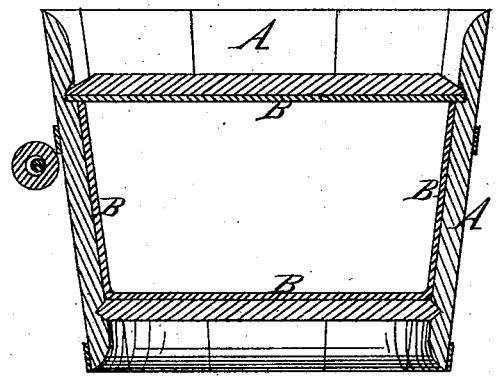

Figure 1 is a side view of a pail containing my improvements; Fig. 2, a longitudinal section of the same; Fig. 3, a sectional view of the rubber lining removed; Fig. 4, a longitudinal section of a butter-pail with rubber lining.

A represents the pail; B, the rubber lining.

The object of my invention is to produce a vessel to contain acids and fatty substances which shall in no way affect the substances, and in no way be affected by them, and at the same time, light, cheap, and strong, and free from the objections which have attended the use of previous contrivances for such purposes.

I accomplish this result by lining the vessel with thin vulcanized rubber, which is cast in a mold to fit the vessel in the usual manner. It is especially designed for use in the manufacture of churns, butter-firkins, ice-pitchers, refrigerating-closets, and all articles of household use which it is desired to secure from a woody taste, as well as in manufacturing utensils and vessels of transportation in which it is essential to keep the substances from impregnating the vessel.

This improved lining, being neutral and water and acid proof, and perfectly inodorous, accomplishes the object completely, and preserves the vessel by keeping it dry. Water kept in such a vessel will never taste of the wood, or paint, or rubber, and butter will retain its sweetness for a long period, as the air is excluded from it and the brine cannot soak out of the butter. The firkin may, then, be made of pine and light and cheap woods, instead of oak and the harder kinds it is now deemed necessary to employ.

What I claim, and desire to secure by Letters Patent, is—

As a new article of manufacture, a vessel adapted to contain acids, oils, and fatty substances, lined with hard rubber, substantially in the manner described.

ANSIL W. MONROE.

Witnesses:
ELIAS C. MONROE,
ISAAC C. MONROE.